(12) United States Patent
Carvalho

(10) Patent No.: US 9,558,497 B2
(45) Date of Patent: Jan. 31, 2017

(54) SYSTEM AND METHOD FOR INTERNET DOMAIN NAME FRAUD RISK ASSESSMENT

(71) Applicant: Emailage Corp., Chandler, AZ (US)

(72) Inventor: Reinaldo A. Carvalho, Chandler, AZ (US)

(73) Assignee: Emailage Corp., Chandler, AZ (US)

( * ) Notice: Subject to any disclaimer, the term of this patent is extended or adjusted under 35 U.S.C. 154(b) by 492 days.

(21) Appl. No.: 14/216,998

(22) Filed: Mar. 17, 2014

(65) Prior Publication Data

US 2015/0262193 A1    Sep. 17, 2015

(51) Int. Cl.
*G06Q 30/00*    (2012.01)

(52) U.S. Cl.
CPC ................................. *G06Q 30/0185* (2013.01)

(58) Field of Classification Search
None
See application file for complete search history.

(56) References Cited

U.S. PATENT DOCUMENTS

| 9,197,649 B2 | 11/2015 | Carvalho | |
| 2006/0095586 A1* | 5/2006 | Adelman | G06Q 10/107 709/245 |
| 2007/0208869 A1* | 9/2007 | Adelman | G06Q 10/107 709/229 |
| 2010/0313253 A1* | 12/2010 | Reiss | G06F 21/51 726/7 |
| 2011/0055911 A1* | 3/2011 | Adelman | G06Q 10/107 726/7 |

\* cited by examiner

*Primary Examiner* — Robert R. Niquette
(74) *Attorney, Agent, or Firm* — Cooley LLP

(57) ABSTRACT

Internet Domain Name Fraud Risk Assessment using a system of data element collection and computation. Data elements associated with the Internet Domain Name are acquired from internal and external data sources, captured, evaluated, and then assigned a value. Data acquisition may include use of domain information, databases, corporate and social media services, and search engine services. Using the assigned values, an Internet Domain Name category type and a Fraud Risk Score are computed and then displayed to a user along with additional information, explanations and recommendations.

9 Claims, 4 Drawing Sheets

Internet Domain Name Risk Assessment

Fig. 3

| Data Element | Condition |
|---|---|
| Domain Existence | Verified and shared |
| Domain Creation Date | Captured and shared |
| Domain Country | Captured and shared |
| Domain Category | Calculated |
| Domain Risk | Calculated |
| Domain Registrar | Captured only |
| Domain Expiration Date | Captured only |
| Date Last Updated | Captured only |
| DNS Server Location | Captured only |
| DNS Admin Phone Number | Captured only |
| Domain Rate | Calculated |
| Domain Website | Captured |
| Domain Mail Server | Captured |
| Domain First Seen | Calculated |

Fig 4

SYSTEM AND METHOD FOR INTERNET DOMAIN NAME FRAUD RISK ASSESSMENT

CROSS-REFERENCE TO RELATED APPLICATION

Not Applicable

FEDERALLY SPONSORED RESEARCH

Not Applicable

SEQUENCE LISTING OR PROGRAM

Not Applicable

BACKGROUND

The present invention relates to a system and method for assessing the fraud risk of associated with a domain name.

Fraud is a deception deliberately practiced in order to secure unfair or unlawful gain (adjectival form fraudulent; to defraud is the verb). Fraud activity can happen in various forms, like the use of Internet services or software with Internet access to defraud victims or to otherwise take advantage of them, for example by stealing personal information, which can even lead to identity theft. Internet services can be used to present fraudulent solicitations to prospective victims, to conduct fraudulent transactions, or to transmit the proceeds of fraud to financial institutions or to others connected with the scheme. Domain names can be created and used with fraudulent purposes, as a criminal deception intended to result in financial or personal gain.

The present invention seeks to determine the fraud risk of an Internet Domain Name by delivering critical information about the Internet domain name to help individuals and businesses minimize the risk of fraudulent domain names. The validation of an Internet domain name data is an important component when assessing the fraud risk associated with an Internet domain name, and data normalization. The solution is found in the present invention, which comprises a system and methodology for Internet domain name fraud risk assessment utilizing machine learning algorithms. The system and methodology involves the collection of data elements associated with an Internet domain name from numerous sources, categorizes the domain name, verifies the domain name's current and historical status, and verifies the existence of the Internet domain name, The system and methodology calculates and describes the fraud risk indicators for the Internet domain name.

SUMMARY

A system and method to assess the fraud risk associated with an Internet domain name is disclosed. Determination of Internet domain name fraud risk includes verifying the domain name address, comparing and matching the domain name against preexistence lists with both historical and fraud information, and collecting data elements for the Internet domain name. The data elements may be acquired from internal and external data sources, each data element is then assigned a value corresponding to a predetermined scale. By computing the data element values, a Fraud Risk Score is then determined and returned to the user along with additional data elements linked to the Internet domain name. The system and method can further define a domain name's categorization, country of origin, server where the domain name is hosted, website and other associations, such as email servers, and then indicate a status to assess the fraud risk associated with the domain name. This determination in turn can be used to prevent and detect fraud, to serve as an additional layer of protection against fraud incidents, such as for example, for new applications of financial products or services, and in many other areas involving commerce and online transactions.

DRAWINGS

These and other features, aspects, and advantages of the present invention will become better understood with regard to the following description of the preferred embodiments, appended claims, and accompanying drawings.

FIG. 3 illustrates a visual depiction of a results page embodying features of the present disclosure for a system and method for Internet domain name fraud risk assessment.

FIG. 4. illustrates a table of data elements and conditions for the "domain portion" of an Internet domain name.

DESCRIPTION

As shown in FIGS. 1-4, a system and method to assess the Internet domain name fraud risk is disclosed. Determination of Internet domain name fraud risk includes verifying the address, comparing and matching it against preexistence lists with both historical and fraud information, collecting data elements for the Internet domain name, in real-time using activity and behavioral information and utilizing neural and machine learning algorithm to predict the fraud risk related to the domain. The data elements may be acquired from internal and external data sources, each data element is then assigned a value corresponding to a predetermined scale. By computing the data element values, a Fraud Risk Score is then determined and returned to the user along with additional data elements linked to the Internet domain name.

One of skill in the art will recognize that the methods of the present disclosure may be implemented as one or more software processes executable by one or more processors and/or one or more firmware applications. The processes and/or firmware are configured to operate on one or more general purpose microprocessors or controllers, a field programmable gate array (FPGA), an application specific integrated circuit (ASIC), or other hardware capable of performing the actions describe above. In an exemplary embodiment of the present invention, a CPU executes software processes to perform the actions of the present disclosure. Additionally, the present invention is not described with reference to any particular programming language. It will be appreciated that a variety of programming languages may be used to implement the teachings of the invention as described herein.

It is also to be understood that the methods may be employed with any form of memory device including all forms of sequential, pseudo-random, and random access storage devices. Storage devices as known within the current art include all forms of random access memory, magnetic and optical tape, magnetic and optical disks, along with various other forms of solid-state mass storage devices. The current invention applies to all forms and manners of memory devices including, but not limited to, storage devices utilizing magnetic, optical, and chemical techniques, or any combination thereof.

Figure 1:
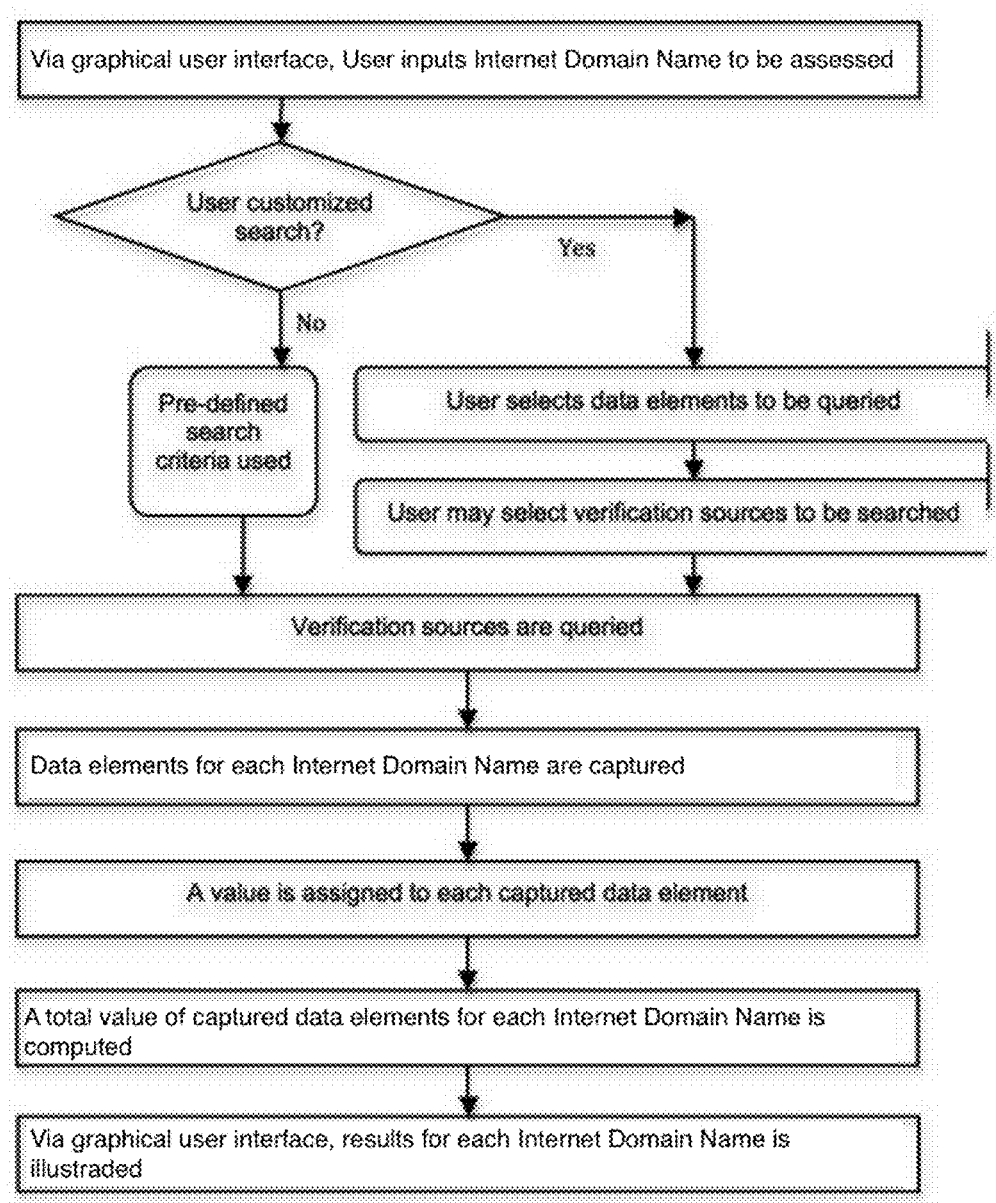
FIG. 1 illustrates a method embodying features of the present disclosure for a system and method for Internet domain name fraud risk assessment.

FIG. 1 illustrates a preferred method to assess the fraud risk of Internet domain name. The present disclosure is directed to obtaining information regarding the various data elements of the Internet domain name. FIG. 4 illustrates a possible table of data elements and conditions for the Internet domain name as ascertained by an implementation of the system and method to assess the fraud risk of Internet domain name.

Figure 2:
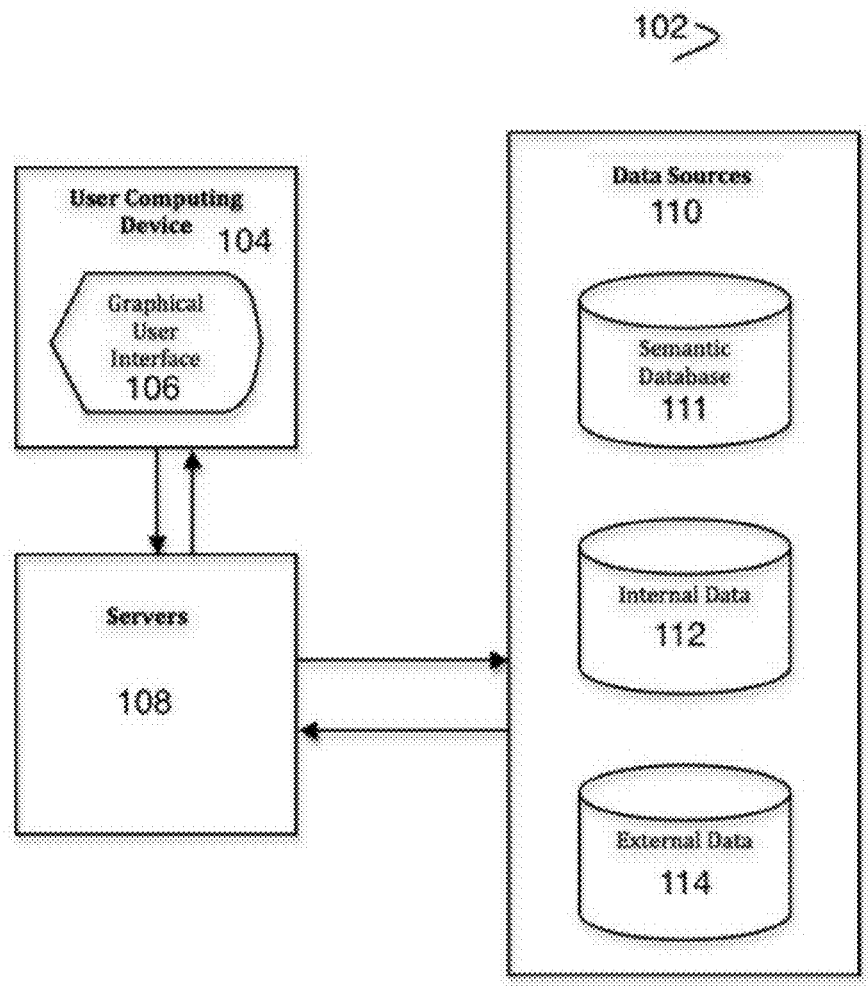
FIG. 2 is a block diagram illustrating a system embodying features of the present disclosure for a system and method for Internet domain name fraud risk assessment.

In a preferred embodiment of the present system and method, the existence of an Internet domain name may be validated via the collection of data elements from various data sources 110 as illustrated in FIG. 2. The data sources 110 may include but are not limited to contacting an external data 114 sources or internal data 112 sources. Examples of contacting an external data 114 source include sending an inquiry to a Whois or publicly accessible services such as those available through a query and response protocol. Examples of an internal data 112 source include proprietary or non-proprietary database of local Domains information which can store data such as an Internet domain name repository with historical information as well as a domain name "blacklist" associated with previously discovered fraudulent Internet domain name. The internal data 112 may also include a list of Internet domain name that is managed by the system or when the user has manually marked as fraudulent or credible. This data may then be accessed during implementation of the present disclosure to prevent recurring examination of an Internet domain name. One of ordinary skill in the art will recognize that any additional sources of Internet domain name data may also be used by implementations of the system.

In an embodiment of the present disclosure, once an Internet domain name has been obtained by the system, the authentication and verification process begins by querying a proprietary or non-proprietary database 111 to determine whether any information has previously been collected regarding the Internet domain name. If the Internet domain name is found in the database 111 with a positive status or is "certified", wherein the Internet domain name has been determined to exist and has a recorded creation date, the process may end at this stage and the information from the database 111 will be used. Otherwise, in some implementations, the system may move to an additional stage to collect more details about the Internet domain name.

The external data 114 source inquiry may be sent to one or more external data sources to verify when the Internet domain name was created and to collect data elements associated with the Internet domain name. If the information is retrieved successfully, the best available Internet domain name data elements may be stored for the account.

In yet another embodiment of the present disclosure, information for the Internet domain name may be collected using a query and response protocol or publicly available services such as, for example Whois. One of ordinary skill in the art would recognize that an implementation of the disclosed method may be conducted in any order.

The following is a list of possible data elements and their respective definition that may be captured through various steps implemented in the present disclosure:

1. 'Internet Domain Name Exist'=Verification of whether the Internet Domain Name exists;
2. 'Internet Domain Name Creation Date'=Date when Internet Domain Name was created;
3. 'Internet Domain Name Country'=Country of origin for the Internet Domain Name;
4. 'Internet Domain Name Category'=Category type for the Internet Domain Name; and
5. 'Internet Domain Name IP Address'=IP address for the Internet Domain Name.
6. 'Internet Domain Name Risk'=Risk associated to the domain name
7. 'Internet Domain Name Registrar'=Entity used to register a domain name
8. 'Internet Domain Expiration Date'=Date of the next expiration date for the domain name
9. 'Internet Domain First Seen'=Date of the first time the domain name was first seen. Usually the date of the creation of the domain, if this info is not found the value will be equal to the first time this Internet Domain was queried on the system.
10. 'Internet Domain Last Updated'=Date of the last time the Domain Name was queried and updated on the system.
11. 'Internet Domain Server Location'—Place where the domain name is being currently hosted.
12. 'Internet Domain Admin Phone Number'—Domain Administrator's phone number collected from the registrar.
13. 'Internet Domain Rate'—Credibility Rate associated to the Domain Name based on various data sets.
14. 'Internet Domain Website'—Website associated to the domain name.
15. 'Internet Domain Mail Server'—Server name or mail exchanger (MX) records related to the domain name.
16. 'Internet Domain Fraud Weight'—Based on predictive analysis, each domain has a variable reliability weight based on the activities collected through the network.

After verification and data element collection for each Internet Domain Name, an optional prioritization process may be initiated. The prioritization process may be conducted to sort the data element information from most to least important. An example of such a prioritization order may appear as: 1) Internet Domain Name found on proprietary database; 2) Whois has provided account information; 3) the oldest Internet Domain Name activity date was found on external data sources; and 4) domain details captured via a database of domain names and other publicly available services; 5) domain syntax and word matching. It should be recognized that any other priority order may also be used and that this priority order may be customized to tailor the results according to user preferences.

A scoring logic is then implemented to compute a "Fraud Risk Score" of each Internet Domain Name, the computation may take place on a user computing device 104. To determine the Fraud Risk Score, a value is assigned to each data element. The value is based on a predetermined or user specified scale that takes into account the type and source of the data element information. The following provides an example of a scale that may be used to assign a Fraud Risk Score and shows the score on the left with an exemplary characteristic that an Internet Domain Name may have to be assigned such a score listed on the right:

850—High Risk Domain—Internet Domain Name from a high risk category, type, hosted location, syntax, country, rate, website content, matched against a negative database or based on predictive machine learning algorithm that detects and determine the fraud risk based on key behavioral elements.

550—Moderate Risk Domain—Internet Domain Name from a moderate risk category, type, hosted location, syntax, country, rate, website content or matched against a positive or negative database.

275—Low Risk Domain—Internet Domain Name from a low risk category, type, hosted location, syntax, country, rate, website content, matched against a positive database or based on predictive machine learning algorithm that detects and determine the fraud risk based on key behavioral elements.

While the above example provides a scale in which a higher Fraud Risk Score indicates a higher likelihood of an Internet Domain Name being unreliable and/or fraudulent, one of ordinary skill in the art would also recognize that a numeric or other scale may be used in which a lower Fraud Risk Score indicates a lower likelihood that the Internet Domain Name is fraudulent.

Figure 3:
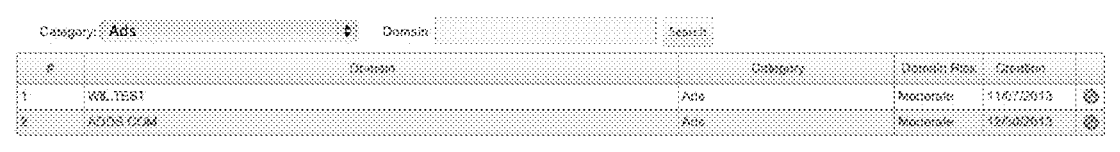

As illustrated in FIG. 3, a graphical user interface 106 may display the Fraud Risk Score for each Internet Domain Name. In addition to the Fraud Risk Score, a description, explanations or category type for the particular Fraud Risk Score of each Internet Domain Name may be displayed to assist the user understand the results. The Internet Domain Name category description takes into consideration information collected during the verification and data element search. The following is an example of class and category description that may be displayed:
1. Abortion: Internet Domain Name related to abortion with no relation to religion
2. Ads: Advertising Internet Domain Name
3. Adult: Internet Domain Name for websites containing adult material
4. Aggressive: Internet Domain Name promoting racism and violence
5. Alcohol: Internet Domain Name for website related to alcohol beverages
6. Anti-Malware: Internet Domain Name for website related to antispyware solutions
7. Arjel: Internet Domain Name for website related to gambling
8. Artnudes: Internet Domain Name containing artistic nudity
9. Astrology: Astrology related Internet Domain Name
10. Audio-video: Internet Domain Name related to audio or/and video download The Internet Domain Name syntax verification takes into consideration information processed from the analysis of the name of the entire or part of the domain name. The following is an example of domain name syntax analysis:
1. chase.co—Highly probable phishing domain syntax with similarity to a very reputable bank domain that is constantly susceptible to email and website phishing.
2. hackingmethods.org—the word 'hacking' could be seen and classified as a potential risky domain name.

The graphical user interface 106 may also display a recommendation based on one or more threshold limits directly related to the risk associated with an Internet Domain Name. For example, if a Fraud Risk Score is greater than or equal to 800, the system may display a message such as, 'Fraud Review' or 'Review for Potential Fraud Risk', indicating that the user may wish to further investigate the authenticity of the Internet Domain Name. In another example, if a Fraud Risk Score between 450 and 550 is assigned, the system may display a message such as 'Unclear Risk' or 'Unclear Risk at this point due to limited Internet Domain Name history' indicating that the user may wish to undertake further process steps in an attempt to further verify the email address. In yet another example, if a Fraud Risk Score is less than or equal to 300, the system may display a message such as 'Low Fraud Risk' or 'Low Fraud Risk due to Internet Domain Name history' indicating that the user may have a high degree of confidence that the Internet Domain Name is credible.

In places where the description above refers to particular implementations of computerized systems and methods for Internet Domain Name fraud risk assessment and credibility rating, it should be readily apparent that a number of modifications may be made without departing from the spirit thereof and that these implementations may be applied to other embodiments of Internet Domain Name risk assessment and credibility rating systems and methods.

All features disclosed in this specification, including any accompanying claim, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed:

1. A method of assessing Internet Domain Name data fraud risk, the method utilizing at least one processor or at least one firmware application configured to:
    (a) enable a user to input at least one Internet Domain Name, wherein at least one data element is selected;
    (b) query at least one data source in at least one proprietary or non-proprietary database to determine whether any information has been previously collected regarding the internet domain name;
    (c) if the at least one proprietary or non-proprietary database certifies the validity of the Internet Domain Name, a positive value is assigned to the Internet Domain Name; and if the at least one proprietary or non-proprietary database certifies the invalidity of the Internet Domain Name, a negative value is assigned to the Internet Domain Name;
    (d) if the at least one proprietary or non-proprietary database cannot certify the validity or invalidity of the Internet Domain Name, another query is made to at least one other data source to collect data elements about the Internet Domain Name;
    (e) assign a value to each data element collected;
    (f) implement a scoring logic to compute a fraud risk score of each domain name based on the values associated with each data element collected; and
    (g) provide a description, category, or explanation for the fraud risk score.

2. The method of claim 1, wherein the at least one data element includes verification of whether the Internet domain name exists, date when the internet domain name was created, country of origin of the Internet domain name, category type of Internet domain name, IP address for the Internet domain name, any risks associated with the domain name, entity used to register a domain name, date of expiration for the internet domain name, date the Internet domain name was first seen, date the Internet domain name was last updated, place where the domain name is hosted, phone number associated with the domain name administrator, credibility rate associated with the internet domain name, website associated with the domain name, Server name, or mail exchange record.

3. The method of claim 1, wherein, when the user has the option to select the inputs at least one Internet Domain Name, the user has an option to select at least one data element to be queried, and at least one data source to be searched, for each internet domain name.

4. The method of claim 1, wherein the at least one data source is an external data source or an internal data source.

5. The method of claim 1, wherein the value is based on a predetermined, or user specified, scale that takes into account the type and source of the data element.

6. The method of claim 1, the method further displaying a recommendation based on one or more threshold limits directly related to the fraud risk score associated with an Internet Domain Name.

7. The method of claim 1, wherein the external source is a third party proprietary database or Application Programming Interface (API).

8. The method of claim 7, wherein the external source is a publicly accessible service.

9. A system for assessing Internet Domain Name data fraud risk, the method comprising at least one processor or at least one firmware application configured to:

(a) enable a user to input at least one Internet Domain Name, wherein at least one data element is selected;

(b) query at least one data source in at least one proprietary or nonproprietary database to determine whether any information has been previously collected regarding the internet domain name;

(c) if the at least one proprietary or non-proprietary database certifies the validity of the Internet Domain Name, a positive value is assigned to the Internet Domain Name;

and if the at least one proprietary or non-proprietary database certifies the invalidity of the Internet Domain Name, a negative value is assigned to the Internet Domain Name;

(d) if the at least one proprietary or non-proprietary database cannot certify the validity or invalidity of the Internet Domain Name, another query is made to at least one other data source to collect data elements about the Internet Domain Name;

(e) assign a value to each data element collected;

(f) implement a scoring logic to compute a fraud risk score of each domain name based on the values associated with each data element collected; and (g) provide a description, category, or explanation for the fraud risk score.

* * * * *